Patented Dec. 12, 1939

2,183,141

UNITED STATES PATENT OFFICE 2,183,141

METHOD OF FERMENTING WHEY TO PRODUCE ALCOHOL

Willem Kauffmann and Pieter Johannis van der Lee, Amsterdam, Netherlands

No Drawing. Application August 17, 1937, Serial No. 159,487. In the Netherlands September 19, 1936

2 Claims. (Cl. 195—37)

Our invention relates to the utilization of the whey formed as a by-product in the production of cheese.

It is an object of our invention to utilize the milk sugar contained in such whey.

It is another object of our invention to recover from the whey valuable products and more especially ethyl alcohol.

In the production of cheese about 70 liters of whey are recovered from every 100 liters of milk employed which hitherto could only be used as fodder.

Our invention contemplates increasing the value of the whey, obtained in the production of cheese. To this end we add to the whey microorganisms which, if suitably selected, are capable of converting the milk sugar or lactose contained in the whey within a short period of time into ethyl alcohol.

The types of yeast which are used in the production of ethyl alcohol, for instance from cereals or potatoes, cannot be used in our process, since these types of yeast, while being capable of fermenting glucose, saccharose and maltose, are not capable of fermenting lactose or milk sugar.

We succeed in converting into ethyl alcohol a substantial part of the lactose present in whey by using as microorganisms cultures of yeast which ferment lactose. Yeast capable of fermenting lactose is known as such. It was not known however that such microorganisms are capable of producing within not more than three days ethyl alcohol from whey on an industrial scale.

We have further found that yeast which is particularly suitable for fermenting lactose, may be obtained and isolated from Gervais cheese.

In producing this particularly favorable yeast, which we call yeast B 5, we may for instance proceed as follows: Gervais cheese is inoculated in an agàr-wort, which is then maintained at about 30° C. The several types of yeast cultures thus produced are separated and cultivated and are then tested for their capacity of fermenting lactose under formation of ethyl alcohol. In this manner we obtained six cultures capable of fermenting lactose. We inoculated whey with these cultures and found that only three of them, which greatly resembled each other, brought about fermentation. We further found that these cultures grow, within a range of temperatures between about 10° and 45° C., while the acidity may range between about pH=4.5 and pH=7.0.

In all cases we produce a series of similar cultures of yeast from starting material, such as cheese, which contain yeast microorganisms capable of fermenting lactose. We then select from such series a pure culture which is capable of fermenting within not more than three days the main part of the lactose contained in the whey into ethyl alcohol.

The following examples are intended to illustrate our invention, but we do not wish to confine ourselves thereto.

Example 1

To 5 liters skim milk, heated to 37° C., were added 20 ccms. of rennet-ferment, whereupon the mixture was maintained at a temperature of 37° C. for half an hour. The coagulated mass was cut into small pieces and the whole heated to 80° C. The cheese substance was then percolated through a cloth; 4 liters of whey containing 50 mgs. lactose per ccm. remained over. The acidity was found to be pH=6.2. The whey was then heated 10 minutes to 100° C., and there were withdrawn in a sterile manner 0.5 liter, which after having been cooled were inoculated with about 5 ccms. in wort of the culture mentioned above and isolated from Gervais cheese, and were maintained at 30° C. After the lapse of three days the lactose content had dropped from 50 mgs. to 0.4 mg., while the acidity had risen to pH=5.7. The fermented whey was filtered from the proteins precipitated and the yeast formed; the filtrate which amounted to 400 ccms. was rectified. The distillate which amounted to 125 ccms. was salted out with potassium carbonate, whereby 8.6 grams alcohol of 91%, corresponding to 7.8 grams alcohol of 100%, were separated off. Theoretically 12.2 grams alcohol should have been formed from 500 ccms. whey, so that in this very simple example a yield of $$\frac{7.8}{12.2}=64\%$$

was attained, which is a very satisfactory result, since with the small quantities treated in this example relatively great losses must obviously occur.

Example 2

Here we used as starting material technical whey obtained in a dairy, which had an acidity of pH=6.2 and did not contain more than 47 mgs. lactose per ccm. The whey was treated as described with reference to Example 1. After three days fermentation 12-13 grams alcohol of 100% were obtained from 625 ccms. whey. An average of 43 mgs. lactose per ccm. whey were fermented, thus a total of 43×625 mgs.=27 grams lactose for 625 ccms. whey. Since 10-11 grams alcohol of 100% were obtained, about 40% by weight of the lactose were recovered in the form of ethyl alcohol.

*Example 3*

In the same manner there were obtained 300 grams alcohol of 96% or 288 grams alcohol of 100% from 20 liters whey of an acidity of pH=4.1 which contained only 37 mgs. lactose per ccm. Theoretically 330 grams alcohol of 100% could have formed, so that an output of 88% was obtained in this case.

As the above examples show, we are enabled to practically completely ferment the lactose content of whey according to our method with the aid of the particular kind of yeast, without further additions being required.

We may improve our process by adding to the whey to be fermented nutrients for the microorganisms. We may add for instance ammonium phosphate, ammonium lactate, sodium acetate or amino acids or protein-like substances.

Our invention allows obtaining with the aid of yeast recovered from Gervais cheese, 18-22.5 kilograms ethyl alcohol per cubic meter whey, so that in the production of 100 kilograms cheese there may be obtained 15-17 liters of alcohol as by-product.

Various changes may be made in the details disclosed in the foregoing specification without departing from the invention or sacrificing the advantages thereof.

We claim:

1. The method of treating whey, which comprises adding to pasteurized whey a pure culture of yeast of the kind traceable in Gervais cheese, said culture being selected from a series of similar cultures, which were obtained from starting materials which contain yeast microorganisms capable of fermenting lactose, and having been found capable of converting more than about 65% of the lactose present in the whey into ethyl alcohol within not more than three days.

2. The method of claim 1, wherein the whey with the selected yeast added is maintained between about 10° and 45° C. for fermentation, the pH value being adjusted to range between 4.5 and 7.0.

WILLEM KAUFFMANN.
PIETER JOHANNIS van der LEE.